Sept. 2, 1969   E. W. RYAN   3,464,705
JET ENGINE EXHAUST DUCT SEAL
Filed July 5, 1968   2 Sheets-Sheet 1

INVENTOR.
EDWARD W. RYAN
BY Harry A. Herbert Jr.
and Arsen Tashjian
ATTORNEYS

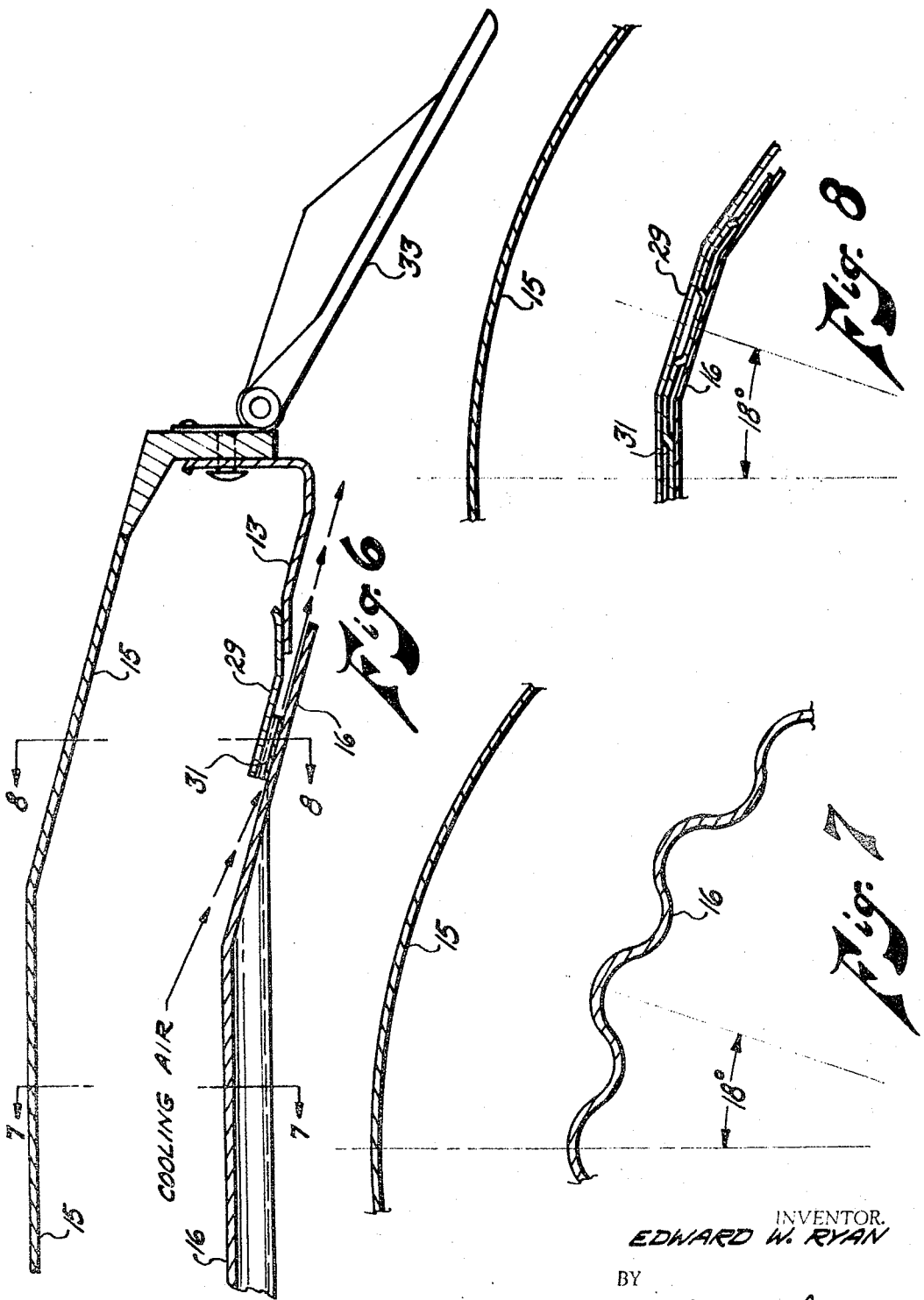

United States Patent Office 3,464,705
Patented Sept. 2, 1969

3,464,705
JET ENGINE EXHAUST DUCT SEAL
Edward W. Ryan, Mason, Ohio, assignor to the United States of America as represented by the Secretary of the Air Force
Continuation-in-part of application Ser. No. 550,584, May 12, 1966. This application July 5, 1968, Ser. No. 748,112
Int. Cl. F16j 15/02, 15/00
U.S. Cl. 277—26                4 Claims

ABSTRACT OF THE DISCLOSURE

A jet engine exhaust duct sealing means including an annular ring for contact with the downstream end of the exhaust duct liner and is attached by utilizing a series of bayonet slots around the periphery which co-operates with a corresponding series of pin members fixedly attached to the exhaust duct when the sealing means is rotated relative to the duct. Locking means including a plurality of locking pins inserted through drilled openings in the exhaust duct and into the sealing means after rotation thereof to prevent counterrotation and release of the seal.

BACKGROUND OF THE INVENTION

This is a continuation-in-part of application Ser. No. 550,584, filed May 12, 1966, and now abandoned.

The present invention relates to an annular seal member positioned between the rear exhaust duct and the exhaust duct liner on a jet engine, and is more particularly concerned with providing a full ring seal which can be replaceably attached to the exhaust duct of a jet engine by utilizing a series of bayonet type slots in the seal cooperating with pin members on the rear exhaust duct, the seal extending upstream therefrom to contact the rearward end of the exhaust duct liner.

In order to provide a controlled flow of cooling air from the compressor rearwardly through the annular chamber formed by the outer engine casing or exhaust duct and the exhaust duct liner, it is necessary to provide a seal at the rearward end of the exhaust duct. This is known in the art as an aft seal and is presently attached to the rear exhaust duct by means of welding. A heat affected zone is thereby created in the area of the weld. Frequently, circumferential cracks caused by high thermal stresses during operation of the jet engine develop in this heat affected zone and result in failure of the seal and leakage of the cooling gases. Since the seal is not readily replaceable, this failure can only be corrected by repairing the weld in the area where the seal is damaged. This can result in major engine failure and loss of air time or even the aircraft itself.

SUMMARY OF THE INVENTION

The exhaust duct aft seal according to the present invention can be readily attached and detached from the engine when replacement becomes necessary. This advantage is achieved by providing a series of bayonet slots around the periphery of the annular seal member. A corresponding series of pins are fixedly attached to the exhaust duct. The seal is attached to the exhaust duct by placing the pins in line with the slots and rotating the seal clockwise until the pins rest in the base of each of the corresponding slots. Locking means are then provided to insure that the seal is in the correct position and serve to prevent untimely disengagement of the seal from the duct. To replace the seal, the locking means are removed and the seal is rotated counterclockwise relative to the duct, thereby allowing the seal to be separated from the duct. A new seal can then be attached in the above-described manner.

Accordingly, it is an object of the invention to provide a jet engine exhaust duct seal which can be readily attached to and detached from the exhaust duct when replacement becomes necessary.

Another object of the invention is to provide a replaceable annular exhaust duct seal member which includes locking means for preventing inadvertent disengagement from the exhaust duct as well as indicating when the seal is in correct position on the duct.

Still another object of the invention is to provide an annular seal member for the exhaust duct of a jet engine which is capable of conforming to relative expansion or contraction of the various jet engine parts during operation without producing cracks which would require repair or replacement.

A still further object of the invention is to provide a jet engine exhaust duct seal which can be readily replaced when worn or damaged without replacing other parts of the engine which are not worn or damaged.

These and other objects, features and advantages will become more apparent after considering the following detailed description taken in conjunction with the annexed drawings and appended claims.

DESCRIPTION OF THE DRAWINGS

In the drawings wherein like reference characters refer to like parts in the various views:

FIGURE 6 is a longitudinal cross-sectional view of the rearward section of the exhaust duct chamber showing the exhaust duct, the duct liner and the aft seal;

FIGURE 7 is a cross-sectional view taken along the line 7—7 of FIGURE 6; and

FIGURE 8 is a cross-sectional view taken along the line 8—8 of FIGURE 6.

PREFERRED EMBODIMENT OF THE INVENTION

The utilization of the present invention is directed toward means for removably attaching the aft seal to a jet engine exhaust duct. The seal is positioned between the rear exhaust duct and the duct liner and serves to provide a controlled flow of cooling air regardless of differential thermal expansion of the duct and liner walls. In the past, it was the general practice to permanently attach the aft seal to the rear exhaust duct by a welding process. The inherent weakness of this attachment procedure was evident by the many failures due to the development of cracks in the heat-affected zone. Also, the aft seal being in the area of intense heat, often required removal and replacement which necessitated the breaking of the weld and rewelding of the replacement seal.

In the present invention, the aft seal can be readily replaced by a simple, easily accomplished procedure. The exhaust duct liner is first moved forward out of contact with the aft seal. The seal locks are removed allowing the seal to be turned a small distance counterclockwise to release and remove the seal. A new seal can be installed by reversing the procedure and the entire replacement operation is easily and quickly accomplished.

Figure 1:
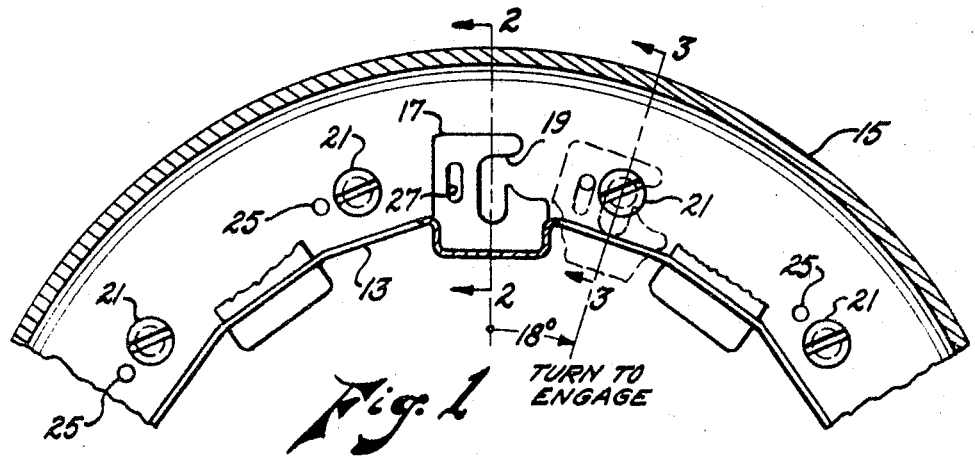
FIGURE 1 is a segmentary front elevation view of a portion of the aft end of a jet engine exhaust duct showing the annular seal according to the invention in position prior to rotation for locking with dotted indication of position after rotation.

Referring now to the drawings, the exhaust duct seal as shown in FIGURE 1 is illustrated in the form of an annular seal member 13 for attachment to the rear exhaust duct 15. In the embodiment shown, the annular seal member 13 is a full ring with twenty flats that mate with corresponding flats on the rearward end of exhaust duct liner 16 (shown in FIGURE 6). A plurality of outwardly extending ear sections 17 are formed on one edge of the annular member 13. A bayonet slot 19 is provided in each of the ear sections 17 for receiving correspondingly positioned axially oriented pins 21 fixedly attached to the exhaust duct 15. The base portion of each of the bayonet slots 19 is elongated in the radial direction to permit expansion and contraction of the annular member 13. Clockwise rotation of the annular member 13 relative to the exhaust duct 15 places the seal in holding position.

Figures 2, 3:
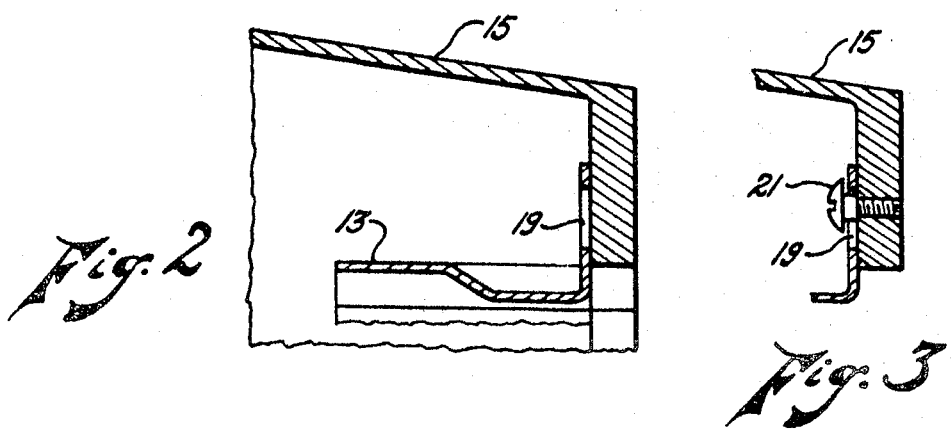
FIGURE 2 is a cross-sectional view taken along the line 2—2 of FIGURE 1.
FIGURE 3 is a partial cross-sectional view taken along the line 3—3 of FIGURE 1 showing the bayonet slot in the seal engaging the pin member on the exhaust duct.
Figure 4:
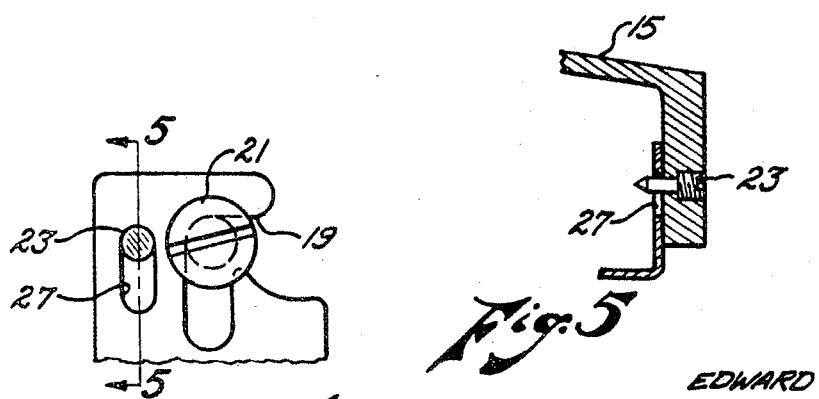
FIGURE 4 is an enlarged front elevation view showing details of the bayonet slot in the seal in engagement with the pin member on the exhaust duct and with locking means in position to prevent counter rotation.
Figure 5:
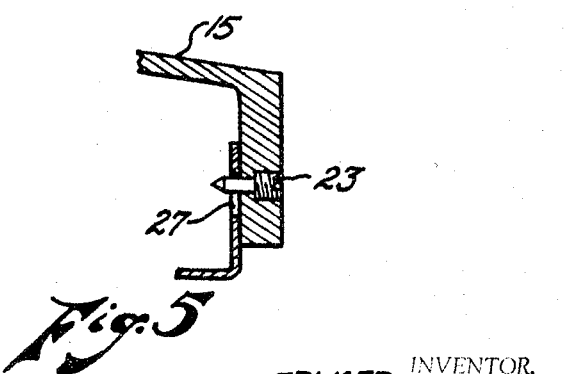
FIGURE 5 is a partial cross-sectional view along the line 5—5 of FIGURE 4 showing the locking means in position.

A corresponding plurality of locking pins 23 are inserted through drilled openings 25 in the exhaust duct 15 and into aligned slotted openings 27 in the ear section 17 after the annular member 13 has been turned to holding position as shown in FIGURES 3 and 4. This prevents the annular member 13 from rotating and disengaging itself from the exhaust duct 15. The opening 27, like bayonet slots 19, is slotted in the radial direction in order to allow unrestricted expansion and contraction of the annular member 13 in the radial direction caused by temperature changes as the engine reaches operating temperature and cools down after use.

In the view shown in FIGURE 6, the aft seal 13 is shown in position on the jet engine exhaust duct 15. A seal contact support 29 is attached to a wiggle strip 31 which in turn is attached to the flats on the end portion of the duct liner 16. The upstream section of the exhaust duct 16 as shown in cross-section in FIGURE 7 is of convoluted configuration to allow for ready expansion and contraction thereof during operation at extremely high temperatures. The downstream end of the liner 16 develops into flats as shown in FIGURE 8 which correspond in number to the convolutions. A variable jet nozzle 33 is attached to the rearward end of the exhaust duct 15. The wiggle strip 31 allows the cooling air to pass between the seal 13 and the liner 16 and thereby ventilate the annular chamber area between the duct 15 and the liner 16.

MODE OF OPERATION

In operation, the annular seal member 13 is positioned in axial alignment with the exhaust duct 15. The ear sections 17 on the seal member 13 are placed against the inner surface of the exhaust duct 15 and in a counterclockwise direction from the axially oriented pins 21. The annular seal member 13 is then rotated clockwise until the axially oriented pins 21 are seated in the base of bayonet slots 19. The locking pins 23 are inserted through drilled openings 25 in the exhaust duct 15 and into the slotted openings 27 in the ear section 17 thereby prevent unwanted counterclockwise rotation and release of the seal 13 from the duct 15.

The exhaust duct liner 16 with the wiggle strip 31 and seal contact support 29 attached at its rearward end is then inserted into the exhaust duct 15. The upstream end of the aft seal 13 comes into direct contact with the seal contact support 29 forming an air tight seal therebetween. The cooling air moving through the annular channel formed by the exhaust duct 15 and the duct liner 16 proceeds through the wiggle strip 31 and into the nozzle section of the jet engine.

If it becomes necessary to replace the seal 13, the duct liner 16 is withdrawn from the exhaust duct 15 thus providing ready access to the seal 13. The locking pins 23 are then removed and the seal rotated in a counterclockwise direction until the pins 21 are disengaged from the bayonet slots 19. The seal 13 can then be removed and a new one attached in the manner described above. It will thus be noted that the seal 13 on the duct 15 is so arranged as to permit ready disconnection while at the same time providing a seal at the downstream ends of exhaust duct 15 and the liner 16 which permits a controlled flow of cooling air regardless of differential thermal expansion of the duct and liner walls.

Although the invention has been illustrated and described in terms of a preferred embodiment thereof, it will be apparent to those skilled in the art that certain changes, alterations, modifications, and substitutions can be made in the arrangement and location of the various elements without departing from the spirit and scope of the appended claims.

Having thus set forth and disclosed the nature of my invention, what I claim is:

1. A replaceable jet engine exhaust duct seal for controlling the flow of cooling air between the exhaust duct and the duct liner comprising a full ring annular seal having a plurality of flats of substantially the same cross-sectional configurations as the rearward end of the exhaust duct liner, a plurality of outwardly extending ear sections disposed on one edge of said annular seal, each of said ear sections having a bayonet slot in one side thereof, a corresponding plurality of axially oriented pins fixedly attached to and extending outwardly from one surface of the exhaust duct, said axially oriented pins being positioned to be received by the bayonet slots in said ear members when said annular seal is positioned in engagement with one surface of the exhaust duct and rotated relative thereto, and locking means for preventing counter rotation of said annular seal relative to the exhaust duct liner.

2. The replaceable seal defined in claim 1 wherein the locking means for preventing counter rotation relative to the exhaust duct comprises a plurality of locking pins positioned in drilled openings in the engaging surface of the exhaust duct, said locking pins dimensioned to extend outwardly from the exhaust duct and into aligned openings in said ear sections in said annular seal.

3. The replaceable seal defined in claim 1 wherein said ear sections include slot means for allowing varying rates of thermal expansion and contraction of said exhaust duct and said duct liner, said slot means providing for movement of the seal in the radial direction while maintaining a substantially fluid tight seal therebetween.

4. The replaceable seal defined in claim 1 wherein the upstream portion of the exhaust duct liner is of convoluted configuration and the downstream end of the duct liner develops into a plurality of flats and includes an annular wiggle strip attached to the downstream end of said duct liner and an annular seal contact support attached to the outer surface of said wiggle strip, the cooling air passing between the duct liner and said seal contact support through said wiggle strip.

References Cited

UNITED STATES PATENTS

| | | | |
|---|---|---|---|
| 1,839,336 | 1/1932 | Oven | 277—235 |
| 2,674,844 | 4/1954 | Boyd et al. | |
| 3,146,992 | 9/1964 | Farrell | 277—26 X |
| 3,325,172 | 6/1967 | Herbold | 277—26 |

SAMUEL ROTHBERG, Primary Examiner

U.S. Cl. X.R.

277—189, 166, 137